US00RE43611E

(19) United States
(12) Reissued Patent
Marx et al.

(10) Patent Number: US RE43,611 E
(45) Date of Reissued Patent: Aug. 28, 2012

(54) CONNECTING STATOR ELEMENTS

(75) Inventors: Peter Marx, Birmeustorf (CH); Kynan Eng, Zurich (CH); Andrew Whalley, Jupiter, FL (US)

(73) Assignee: Alstom Technology Ltd, Baden (CH)

(21) Appl. No.: 11/181,003

(22) Filed: Jul. 14, 2005

Related U.S. Patent Documents

Reissue of:
(64) Patent No.: 6,592,326
Issued: Jul. 15, 2003
Appl. No.: 09/977,195
Filed: Oct. 16, 2001

(30) Foreign Application Priority Data

Oct. 16, 2000 (DE) ..... 100 51 223

(51) Int. Cl.
*F01D 9/04* (2006.01)
(52) U.S. Cl. ..... 415/208.2
(58) Field of Classification Search ..... 415/139, 415/191, 208.2, 211.2
See application file for complete search history.

(56) References Cited

U.S. PATENT DOCUMENTS

| | | | | |
|---|---|---|---|---|
| 3,975,114 | A | 8/1976 | Kalkbrenner | 415/217 |
| 4,000,955 | A | 1/1977 | Tokutomi | 415/183 |
| 4,015,910 | A | 4/1977 | Harmon et al. | 415/217 |
| 4,021,135 | A | 5/1977 | Pedersen et al. | 415/2 |
| 4,063,849 | A | 12/1977 | Modianos | 415/210 |
| 4,101,242 | A | 7/1978 | Coplin et al. | 415/134 |
| 4,204,810 | A | 5/1980 | Vogel | 417/244 |
| 4,240,990 | A | 12/1980 | Inhofer et al. | 261/87 |
| 4,309,145 | A | 1/1982 | Viola | 415/170 R |
| 4,365,929 | A | 12/1982 | Retz | 415/2 R |
| 4,492,517 | A * | 1/1985 | Klompas | 415/139 |
| 4,564,334 | A | 1/1986 | Hergt et al. | 415/199.3 |
| 4,576,548 | A | 3/1986 | Smed et al. | 415/137 |
| 4,576,549 | A | 3/1986 | Lanier | 415/209 |
| 4,594,761 | A | 6/1986 | Murphy et al. | 29/156.8 R |
| 4,606,699 | A | 8/1986 | Hemsworth | 415/170 R |
| 4,648,790 | A | 3/1987 | Hörler | 415/112 |
| 4,679,990 | A | 7/1987 | Yamaura et al. | 417/312 |
| 4,686,376 | A | 8/1987 | Retz | 290/42 |

(Continued)

FOREIGN PATENT DOCUMENTS

EP 0 903 467 A2 3/1999

(Continued)

*Primary Examiner* — Igor Kershteyn
(74) *Attorney, Agent, or Firm* — Leydig, Voit & Mayer, Ltd.

(57) ABSTRACT

In a guide vane element for a gas turbine with a vane blade extending between a platform that is located radially inward in relation to the main housing of the gas turbine and a radially outward platform, a flange is provided on at least one edge of the platforms adjoining an adjacent second guide vane element in the circumferential direction and on the side of the platform facing away from the vane blade. The second guide vane element can be attached, via a second flange provided on a second platform on the second guide vane element. The connection of the platforms forms a cover band, or a connection between the guide vane elements that is tight, flush, and stress-free at different temperatures. The attachment of two adjoining platforms to each other in the area facing away from the vane blades is a connection that is in flush contact with the adjoining flange of an adjoining platform, while a gap remains between the adjoining platforms in the area facing the vane blade and the operating gases, when the temperature remains evenly distributed and high.

30 Claims, 7 Drawing Sheets

U.S. PATENT DOCUMENTS

| | | | | | |
|---|---|---|---|---|---|
| 4,802,821 | A | | 2/1989 | Krietmeier | 415/210 |
| 4,870,826 | A | | 10/1989 | Daguet et al. | 60/751 |
| 4,907,946 | A | | 3/1990 | Ciokajlo et al. | 415/209.3 |
| 4,957,412 | A | | 9/1990 | Olson et al. | 415/189 |
| 5,066,194 | A | | 11/1991 | Amr et al. | 415/223 |
| 5,076,070 | A | | 12/1991 | Takushima et al. | 62/426 |
| 5,115,642 | A | | 5/1992 | Cvelbar et al. | 60/751 |
| 5,141,395 | A | | 8/1992 | Carroll et al. | 415/196 |
| 5,149,248 | A | | 9/1992 | Cramer | 415/169.2 |
| 5,161,947 | A | | 11/1992 | Eckfeldt et al. | 415/211.2 |
| 5,209,634 | A | | 5/1993 | Owczarek | 415/150 |
| 5,244,347 | A | | 9/1993 | Gallivan et al. | 416/189 |
| 5,249,921 | A | | 10/1993 | Stueber et al. | 415/138 |
| 5,297,931 | A | | 3/1994 | Yapp et al. | 415/208.1 |
| 5,362,204 | A | | 11/1994 | Matyscak et al. | 415/213.1 |
| 5,370,498 | A | | 12/1994 | Klingler | 415/223 |
| 5,385,444 | A | | 1/1995 | Kobayashi et al. | 415/182.1 |
| 5,443,363 | A | | 8/1995 | Cho | 415/211.1 |
| 5,454,690 | A | | 10/1995 | Wolfe et al. | 415/119 |
| 5,460,485 | A | | 10/1995 | Sugiyama et al. | 415/208.2 |
| 5,516,263 | A | | 5/1996 | Nishida et al. | 415/208.2 |
| 5,554,000 | A | | 9/1996 | Katoh et al. | 415/208.2 |
| 5,554,001 | A | * | 9/1996 | Boyd et al. | 415/209.2 |
| 5,616,000 | A | | 4/1997 | Yamada et al. | 415/191 |
| 5,704,211 | A | | 1/1998 | Hatfield | 60/726 |
| 5,709,531 | A | | 1/1998 | Nishida et al. | 415/208.2 |
| 5,749,702 | A | | 5/1998 | Datta et al. | 415/119 |
| 5,752,804 | A | * | 5/1998 | Benoist et al. | 415/209.2 |
| 5,772,401 | A | | 6/1998 | Canova | 415/189 |
| 5,857,833 | A | | 1/1999 | Dev | 415/121.2 |
| 5,964,574 | A | | 10/1999 | Meier et al. | 415/110 |
| 5,984,633 | A | | 11/1999 | Bachinger et al. | 415/209.2 |
| 6,012,899 | A | | 1/2000 | Takada et al. | 415/191 |
| 6,017,187 | A | | 1/2000 | Mueller | 415/208.1 |
| 6,017,191 | A | | 1/2000 | Harmsen | 416/247 R |
| 6,024,536 | A | | 2/2000 | Tsubakida et al. | 416/189 |
| 6,030,286 | A | | 2/2000 | Kameoka et al. | 454/121 |
| 6,050,776 | A | | 4/2000 | Akagi et al. | 415/209.4 |
| 6,077,032 | A | | 6/2000 | Wolfe, Jr. et al. | 415/53.2 |
| 6,077,036 | A | | 6/2000 | Heffron et al. | 415/115 |
| 6,082,966 | A | | 7/2000 | Hall et al. | 415/209.1 |
| 6,092,988 | A | | 7/2000 | Botros | 415/191 |
| 6,099,248 | A | | 8/2000 | Mumm et al. | 415/192 |
| 6,109,868 | A | | 8/2000 | Bulman et al. | 415/144 |
| 6,126,395 | A | | 10/2000 | Shingai | 415/200 |
| 6,261,058 | B1 | | 7/2001 | Kataoka et al. | 415/189 |

FOREIGN PATENT DOCUMENTS

| | | | |
|---|---|---|---|
| EP | 903 467 | A2 | 3/1999 |
| EP | 0 949 404 | A1 | 10/1999 |

* cited by examiner

CONNECTING STATOR ELEMENTS

Matter enclosed in heavy brackets [ ] appears in the original patent but forms no part of this reissue specification; matter printed in italics indicates the additions made by reissue.

FIELD OF THE INVENTION

The invention relates to a guide vane element for a gas turbine that extends between an inner and an outer platform, and that can be connected in a fixed manner with other adjoining guide vane elements.

BACKGROUND OF THE INVENTION

Guide vanes from stators of gas turbines consist of high-alloy metal and are often manufactured, as described, for example, in U.S. Pat. No. 4,015,910, as individual guide vane elements which are then connected with each other to form a guide vane ring. In most cases, such an individual element comprises at least one vane blade, as well as an outer and an inner platform attached to the vane blade. If such elements are connected with each other to form an entire guide vane unit, the respective outer and inner platforms form the cover bands that extend cylindrically and delimit the area through which the operating gases flow. The manufacture by elements facilitates and simplifies the production process. In particular, number, size, and complexity of the casting molds are reduced.

As described, for example, in EP 0 949 404 A1, the elements can be less susceptible to breaks caused by thermal and mechanical loads during operation in their combined form, and also can be easily replaced. The individual elements are also much easier to finish, which is particularly advantageous for the drilling of cooling channels, as they are required for film cooling.

The problems with such guide vane elements usually occur in the connection zones between the platforms. The elements or their platforms should be joined tightly and fixed to each other so that a tight unit of guide vanes is created and a cover band is formed that prevents the uncontrolled exchange of the operating gases and cooling gases separated from the cover band. However, the connection and its geometry must not be so rigid and limiting that the mechanical and thermal loads occurring as a result of the temperature differences between the hot operating gases and cold cooling gases during operation result in material fatigue or even breaking of the elements.

EP 0 903 467 A2 describes, for example, pairs of guide vane blades that can be interconnected with flanges, in which the connection is designed so that the meshing prevents a thermal load and the associated breaks of the elements during operation while simultaneously preserving the tightness of the cover bands.

SUMMARY OF THE INVENTION

The invention provides guide vane elements that can be connected with each other to form guide vane blades, groups, or even a mechanically fixed ring of guide vanes. The connection between the guide vane elements is tight even at the temperatures occurring during operation, without experiencing undesirably high stresses under the mechanical and thermal loads. According to an embodiment of the invention, a first guide vane element for a gas turbine includes a vane blade extending between a platform that is located radially inward in relation to the main housing of the gas turbine, and a radially outward platform. A flange is provided on at least one edge of the platform adjoining an adjacent second guide vane element in the circumferential direction in relation to the main axis, and on the side of the platform facing away from the vane blade. The second guide vane element can be attached to the first guide vane element by a second flange provided on the second guide vane element. The second flange is provided on a second platform connected to the second guide vane element. The guide vane elements are connected by their respective platforms, with the connected platforms forming a substantially cylindrical cover band.

The connection between two adjoining platforms includes in an area facing away from the vane blade a portion that is in flush contact with the adjoining flange. An expansion gap remains between the adjoining platforms in the area facing the vane blade and the high temperature operating gases.

According to aspects of the invention, when the guide vane elements are in a cold state, a gap remains at the connection of the two elements in the area that will face the hot operating gases, while a tight and flush connection exists in the cooler area exposed to the cooling gases. If such a connection is exposed to typical operating temperature conditions, the platforms exposed to the hot operating gases are able to expand with the heat, while the material in the areas containing the actual connection hardly expands at all. This prevents the build-up of stresses in the connection areas as a result of the differences in material behavior. The above-described features prevent a thermally caused gap that would limit the tightness of the connection, and also clearly reduces thermal stresses in the connection areas. This means that this surprisingly simple method is able to prevent thermal stresses and loose points in the connection areas.

A preferred embodiment of the present invention includes features that prevent an exchange of air flowing between the side of the platform facing the vane blade or the side of the cover band, and the side of the cover band facing away from the vane blade. These features ensure an improved tightness of the platforms, and can include sealing lips, sealing lamellas, sealing tubes, and seals that extend into a gap on the vane blade side of the platforms. The use of such features that preferably extend across the entire length of the edge between adjacent platforms increases the tightness of the created cover band, in general, and even if the final operating temperature conditions that correspond to an equilibrium state have not yet been reached or are no longer present in the elements.

According to aspects of an embodiment of the invention, rings can be arranged in the area of the attachment means, with the rings projecting in the direction of the second guide vane element beyond the edge, and with a flush connection with the second guide vane element being achieved via the rings. It is particularly preferred that these rings are constructed as projections cut out of the flange used to connect adjoining platforms, and in particular in the area of an expansion of the flange that is intended for the attachment means. Such rings can be cut in a simple finishing step into elements having different forms and shapes, for example simple rings around attachment holes in the flanges, but also bands or areas extending across the entire length of the edge on the side exposed to the cooling gases.

The rings can also be formed by separate washers that are inserted in the attachment area between two elements. Possible attachment methods for all embodiments can include, but are not limited to screw-nut connections, rivet connection, and welded or hard-soldered connections.

According to the invention, another embodiment can include the above-described features on the outer and inner platforms and furthermore, on both sides of the platforms for connections with additional guide vane elements that adjoin on either side of the platforms. In this manner, the advantages described above, including the prevention of stress build-up, and the maintaining of a tight connection can be achieved for all connection points. The individual elements to be connected need not be identical. The adjoining guide vane elements may be elements with different vane blades or, instead of vane blades, also may be channels. Any desired number of elements can be connected with each other.

BRIEF DESCRIPTION OF THE DRAWINGS

The invention will be better understood from the following detailed description in conjunction with the drawings.

DETAILED DESCRIPTION OF THE INVENTION

Figure 1:
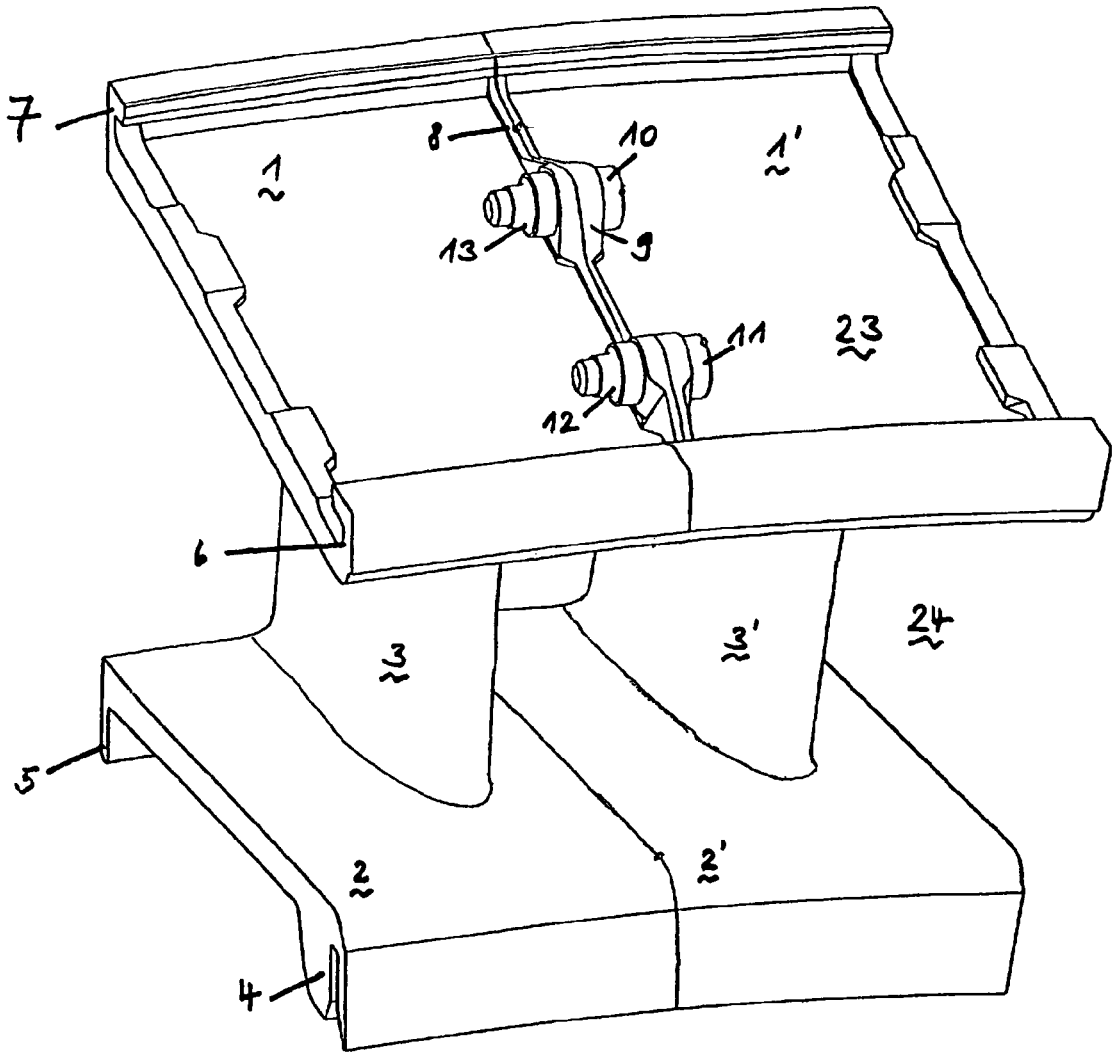
FIG. 1 shows a perspective view of a pair of guide vane elements connected to each other with screw connections.

FIG. 1 shows a pair of guide vane elements connected with each other. The individual elements each consist of an outer platform 1 or 1' and an inner platform 2 or 2', between which the vane blades 3 or 3' extend. If the elements are connected to form a ring, the outer platforms 1, 1' form an essentially cylindrical outer cover band that limits the gas flow to the outside. In a similar manner, the inner platforms 2, 2' form an inner cover band that radially limits the gas flow to the inside. When the turbine is running, hot operating gas flows through the vane blades 3, 3', limited laterally or guided in a specific manner, and limited radially by the inner cover band, and the outer cover band. In most cases, cooling is provided on the cooling gas sides 23 of the platforms that face away from the vane blades, i.e., the platforms are impacted with a cooling gas flow.

The cover bands contact the turbine housing along ribs 4, 5, 6 and 7, and can also be attached to each other. In the pair of elements shown in FIG. 1, the individual elements are provided at adjoining edges with a flange 8 that flushly adjoins the flange 8 of the adjoining element. The flange 8 has two expansions 9 projecting into the cooling air area on the cooling gas sides 23. The elements can be connected with each other through holes 14 via screws 10, 11 and nuts 12, 13 or via rivets. The connection also can be made by welding or hard-soldering; in which case, no expansions 9 may be necessary. An identical connection can be provided on the lower, invisible side of the inner cover band between the inner platforms 2, 2'.

Figure 2:
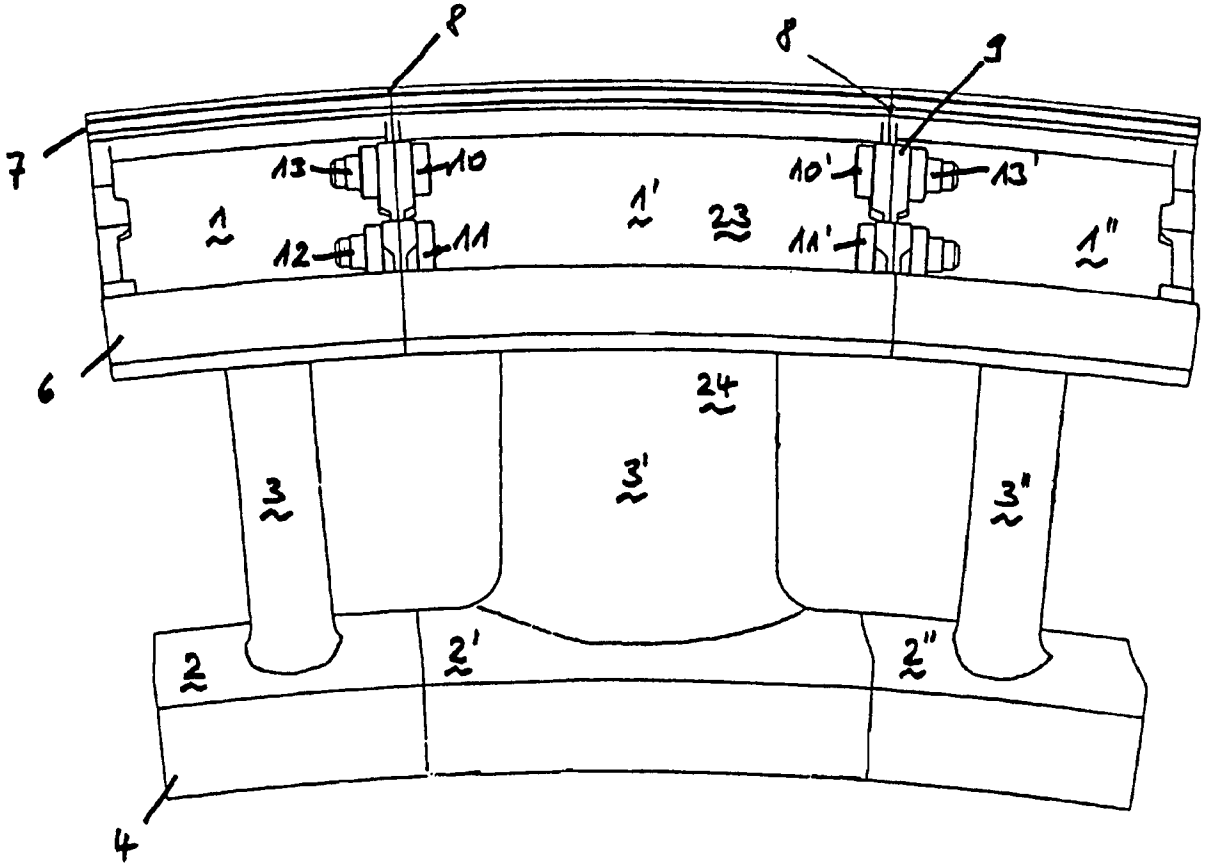
FIG. 2 shows a triplet of elements connected with each other via screw connections, whereby different elements come to rest next to each other.

FIG. 2 shows a triplet of guide vane elements, in which differently designed elements adjoin each other. The middle guide vane blade 3' is constructed significantly wider than the two outer ones 3 and 3". FIG. 2 shows that the attachment mechanisms can be used not only in pairs or entire rings of identical guide vane elements, but also in pairs, groups, or rings of elements with different design and dimensions.

Figure 3:
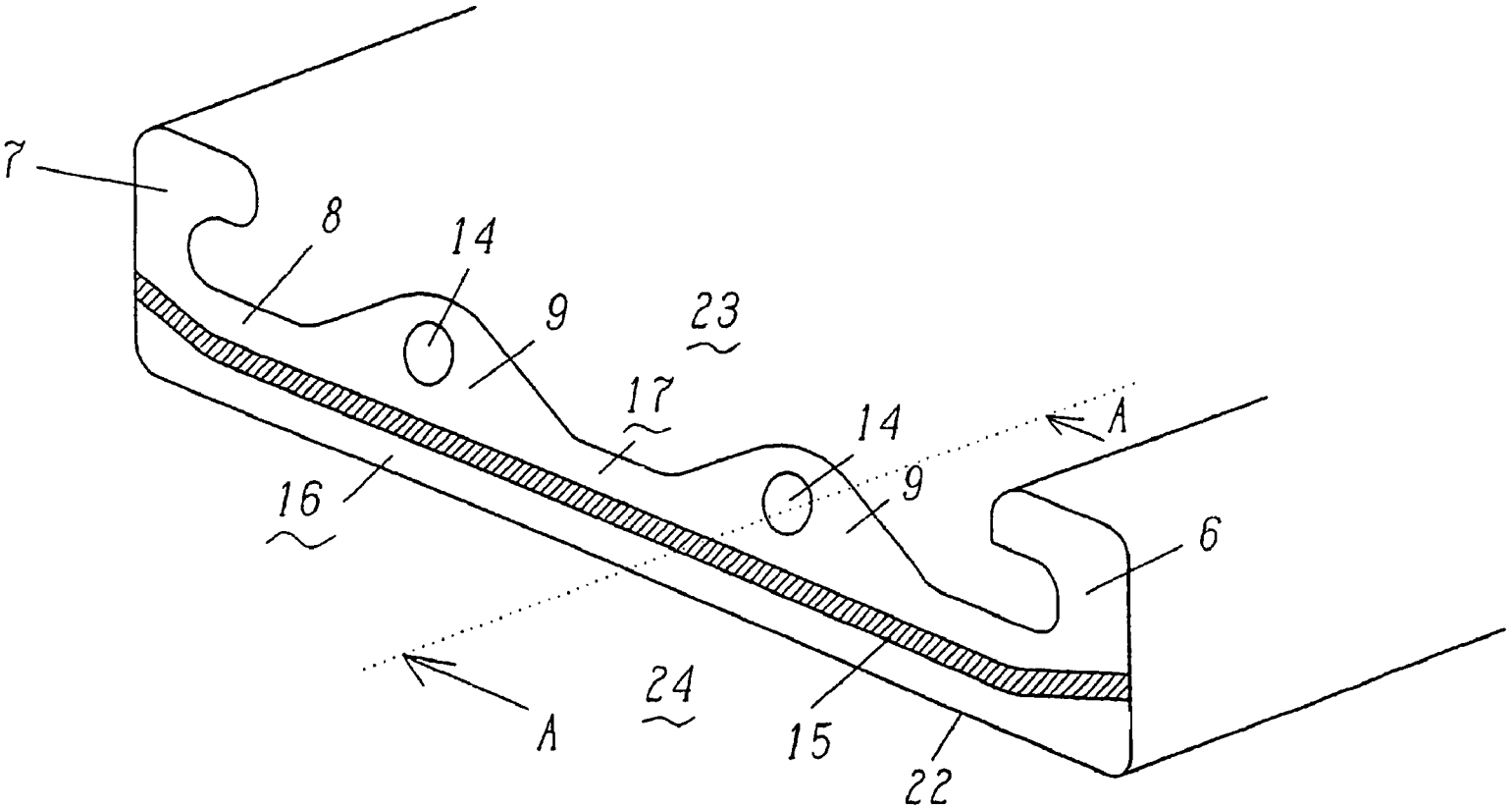
FIG. 3 shows a perspective view of the edge of a conventional guide vane element.

FIG. 3 shows a view of a conventional flange 8. The flange has two expansions 9 on the cooling gas side 23, in which holes 14 have been provided, and into which attachment means can be inserted. The cooling gas side 23 is insulated from the operating gas side 24 using a seal 15 provided in the edge in order to prevent an exchange of gases through the cover bands. The seal 15 extends essentially parallel to the platform and across the entire length of the element.

Figure 4:
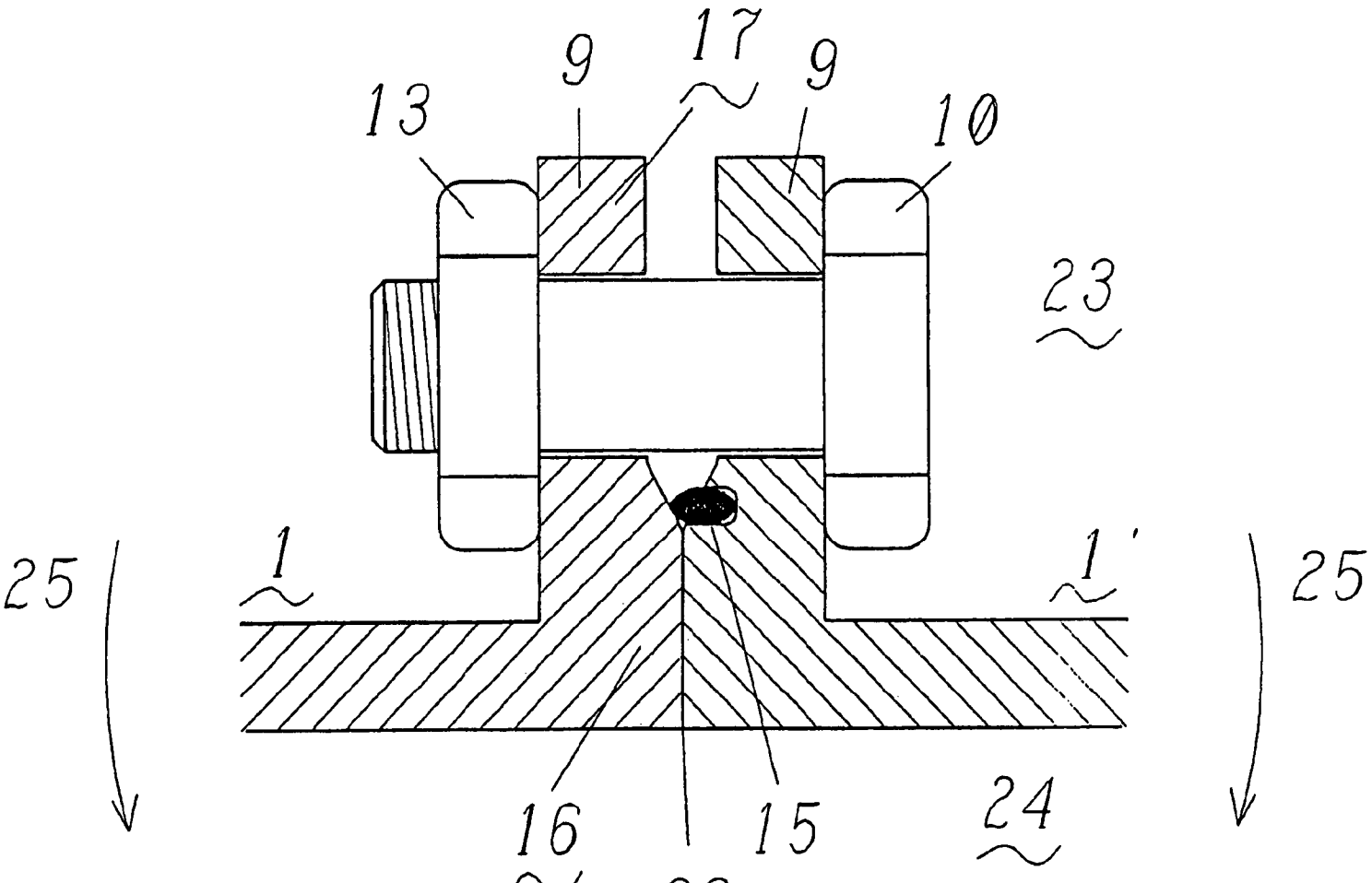
FIG. 4 shows a section taken along line A-A in FIG. 3, with the platforms being at operating temperature.

FIG. 4 shows a section along line A-A of FIG. 3 through a connection of two such flanges in their state at operating temperature. Both elements are connected with each other using a screw 10 and a nut 13. During operation, a high temperature occurs on the operating gas side, and a relatively low temperature occurs on the cooling gas side 23. Because of this temperature distribution, a temperature gradient exists along the flange, i.e., vertically to the plane defined by the platform. The temperature gradient can cause different material behavior along the interface, i.e., the element material expands in the heating zone on the operating gas side 16, while it hardly changes in the cooling zone on the cooling gas side 17. As a result, a flange 8 that is tightly and flushly connected in the cold state, can be distorted under operating conditions, and a situation like the one in FIG. 4 occurs. In the cold connection area, a high stress builds during operation, which is able to exert a strong load on the attachment, whether the attachment is a screw connection or rivets or a welding seam. The top gap in the area of the screw shown in FIG. 4 does not occur in reality, but is intended to symbolize the tendency of the platform expansion that is responsible for exerting a load on the connection elements. The thermally caused distortion also causes the undesirable bending moment indicated by arrow 25.

As a result, the attachment is no longer tight and flush even after only a few heating and cooling cycles. This effect can be countered in part by setting a high preload in the attachment in the cold state. However, the high preload stresses the attachment means causing stresses to build at the flanges at operating temperatures that are so high, that material fatigue or even material breaks must be expected.

Figure 5:
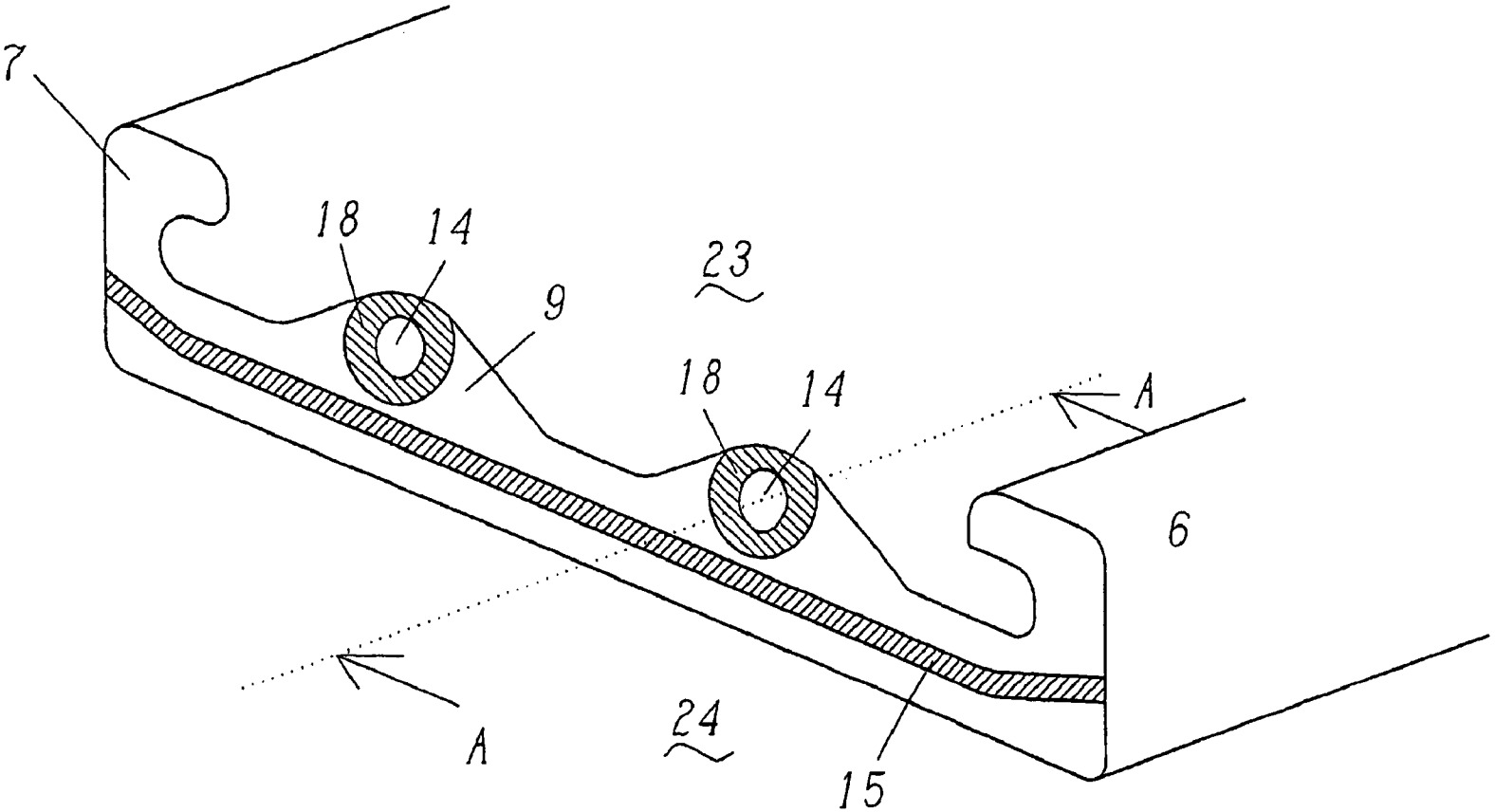
FIG. 5 shows a perspective view of a platform of a guide vane element according to an embodiment of the invention.
Figure 6:
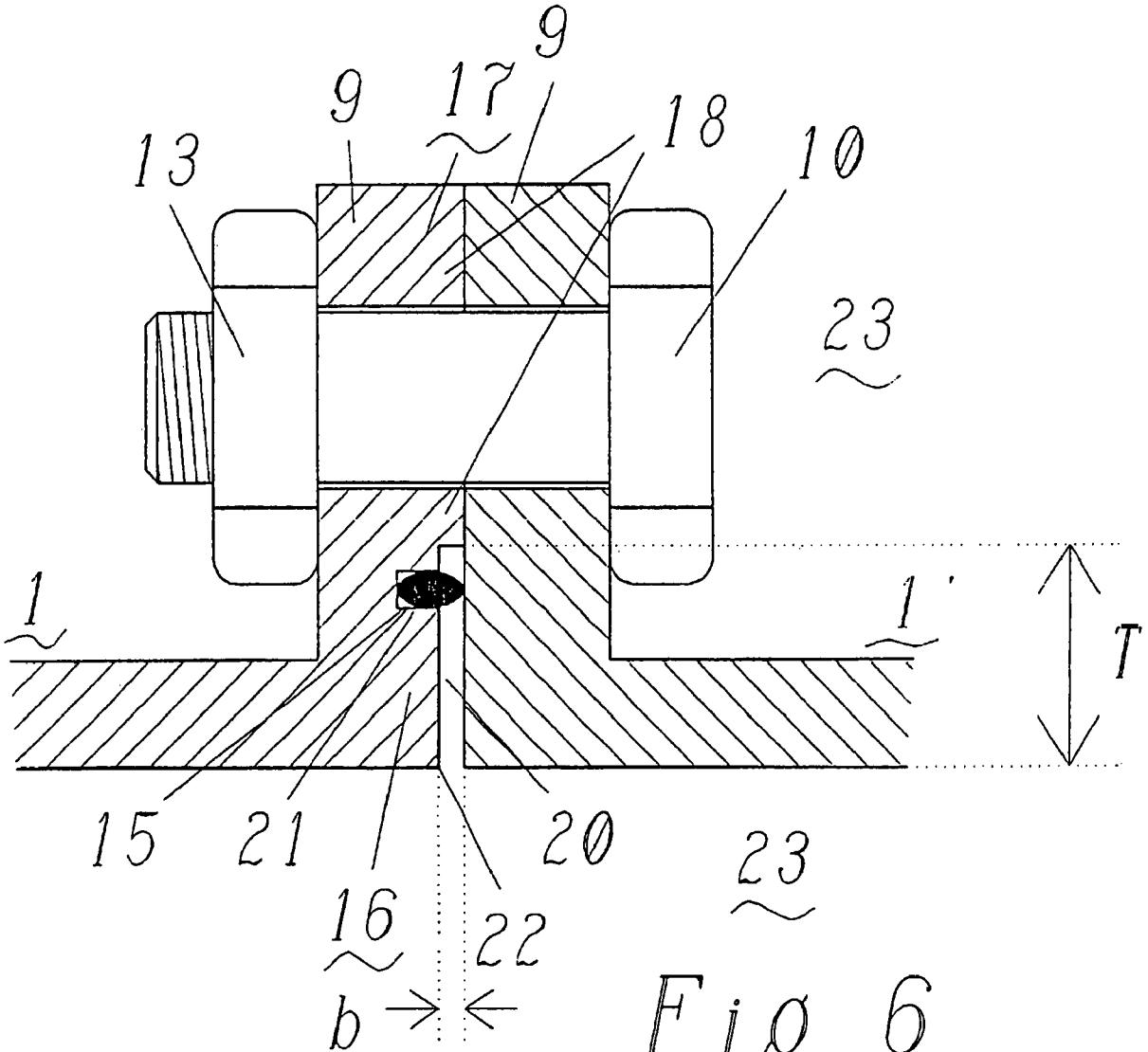
FIG. 6 shows a section taken along line A-A in FIG. 5, through the connection area of a pair of platforms in their cold state, with rings formed as projections from the flanges.

FIG. 5 shows an embodiment of a flange that avoids the above effects. The flange 8 has projections 18 in the area 9 of the attachments, which project beyond the edge in the direction of the adjoining element. The projections here are constructed as rings around the holes 14 in the expansions 9; however, they could also extend over the entire length of the element on the cooling gas side of the seal 15, or could have the form of bands or support points. FIG. 6 shows a section of two connected elements at a low temperature along line A-A in FIG. 5. It shows how the projection 18 extends in the cold state around the width b in front of the edge 22. The projection 18 is provided on the cooling gas side above the seal 15 set into a recess 21; and in the direction of the operating gas side 24, a gap 20 remains between the platforms 1 and 1'. The seal 15 ensures that a tight connection that also prevents a gas exchange is provided between the elements, even at a low temperature of the elements (such as shown), i.e., if the differentiated temperature behavior between the flange 8 has not yet occurred. If the area 16 now expands due to a heating of the operating gas side 24, this does not cause a stress to build up in the flange, but only causes the gap 20 to narrow.

Given typical temperature and flow conditions of a gas turbine, a gap spacing in the cold state is in the range b=0.5-1.0 mm, and the gap has a depth in the range from T=10-30 mm.

A gap 20 can be formed in different ways. A guide vane element can be cut down along the edge on the cooling gas side in a finishing step while preserving the projections 18. This can be accomplished either in only one of the adjoining platforms, as shown in FIG. 6; or it may be found to be advantageous to provide along portions of both edges a projection of approximately half height, so that the distortions that occur at operating temperatures can be symmetrically compensated in the connection.

Figure 7:
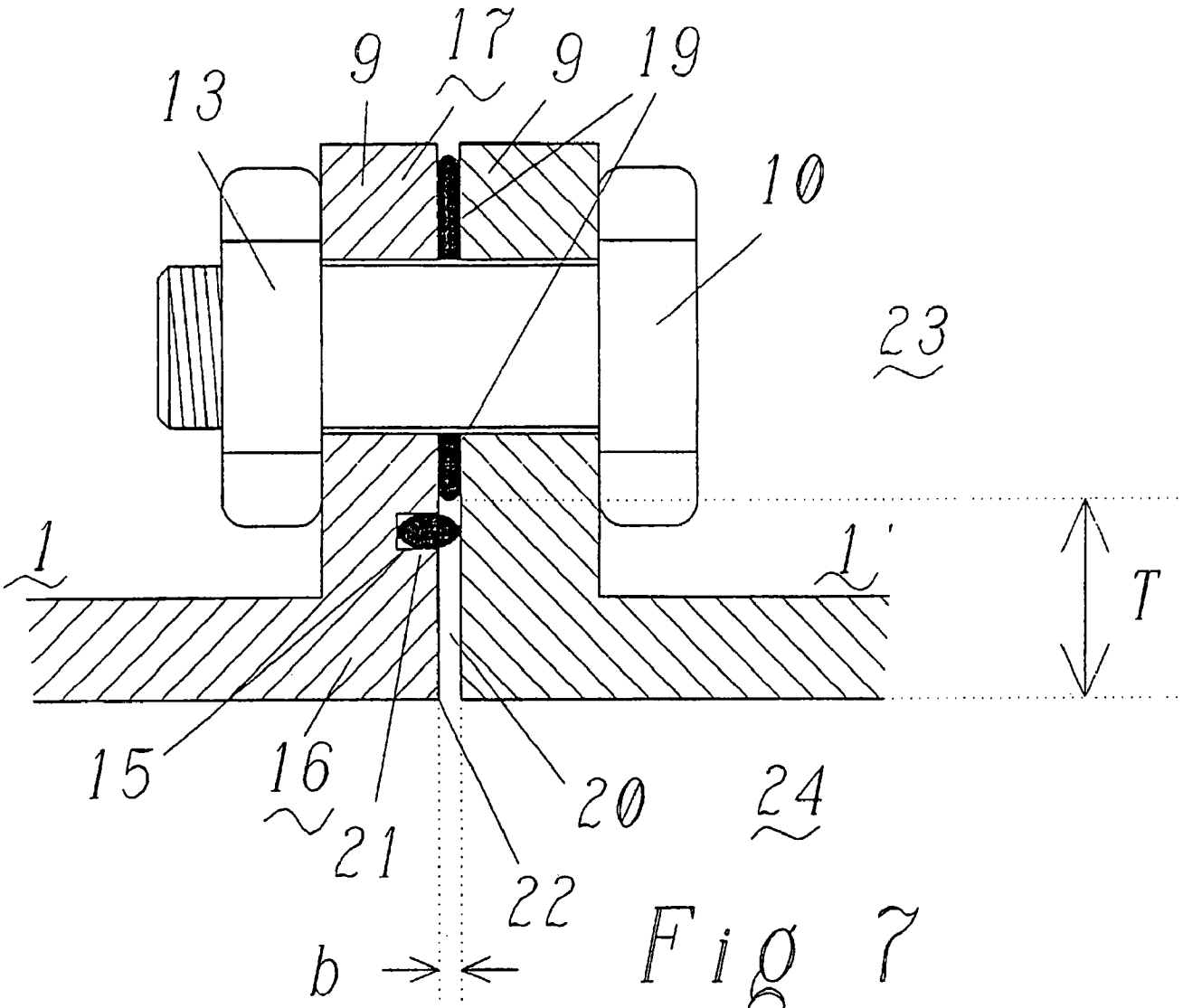
FIG. 7 shows a section taken along line A—A in FIG. 5, through the connection area of a pair of platforms in their cold state, with the rings constructed as washers.

The gap also can be constructed by simply inserting a washer 19 or equivalent between the two platforms 1 and 1' at expansions 9. This embodiment is shown in FIG. 7 in the form of a section at cold temperature. The advantage of this solution is not only its simplicity, but also the fact that the gap 20 in this way can be set in an adjustable manner to different operating temperatures. The selection of a washer with the thickness b in this way determines the dimensions of gap 20. In addition, there is the advantage that a material can be chosen as washer material that is different from the material of the elements. It also would be conceivable to use special metal alloys, plastics, or ceramics as a washer material, the temperature, tension, torsion, and stress behavior of which can be adjusted optimally depending on specific requirements.

What is claimed is:

1. A guide vane element for a gas turbine, comprising:

a first vane blade extending radially relative to the main body of the gas turbine between a first radially inward platform and a first radially outward platform;

a second vane blade extending radially relative to the main body of the gas turbine between a second radially inward platform and a second radially outward platform;

at least one edge of at least one of the first radially inward or outward platforms on a side of the platform facing away from the first vane blade adjoining an adjacent edge of an adjoining one of the second radially inward or outward platforms, a first flange being provided on said at least one edge and a second flange being provided on said adjacent edge, said flanges being for connecting adjoining platforms in a circumferential direction relative to the main axis of the turbine to form a cover band;

the connection between said flanges including an area in flush contact on a side of said adjoining platforms facing away from the vane blades and an area having a gap between the adjoining platforms on a side facing the vane blades at a state when the platforms are exposed to high operating temperatures.

2. The guide vane element according to claim 1, further including:

sealing means for preventing an exchange of air flowing between the side of the adjoining platforms facing the vane blades and the side of the adjoining platforms facing away froth the vane blades.

3. The guide vane element according to claim 2, wherein:

the sealing means includes at least one seal extending into the gap, said at least one seal being arranged at least partially in a recess formed in at least one of said flanges.

4. The guide vane element according to claim 1, wherein:

the connection between said flanges includes at least one ring arranged between the adjoining platforms and projecting from a respective edge of one of the platforms toward the flange on the edge of the adjoining platform, with the at least one ring forming the area in flush contact.

5. The guide vane element according to claim 4, wherein:

the at least one ring is formed as a projecting portion of at least one of said flanges.

6. The guide vane element according to claim 4, wherein:

the at least one ring is a washer.

7. The guide vane element according to claim 1, wherein:

the connection between adjoining flanges includes at least one of a screw-nut connection, a rivet connection, a welded connection, and a hard-soldered connection.

8. The guide vane element according to claim 1, wherein:

two or more adjoining radially inward and/or two or more adjoining radially outward platforms are connected along respective adjoining edges by flanges formed along said adjoining edges.

9. The guide vane element according to claim 8, wherein:

the first and second vane blades are different in structure from each other.

10. The guide vane element according to claim 1, wherein:

the gap has a width b that is in the range of b=0.5 to 1.0 mm, and the gap has a depth T that is in the range of T=10 to 30 mm.

*11. A guide vane element for a gas turbine, comprising at least one platform and a blade extending from the platform, the platform comprising a hot gas side adjacent the blade and a cold gas side opposite the hot gas side, the platform further comprising at least a first edge having a surface extending from the hot gas side to the cold gas side and at least one projecting area extending a first elevation from the surface, and further comprising a recess provided in the first edge surface and extending essentially from the upstream side of the platform to the downstream side of the platform, and further comprising an upstream side and a downstream side as defined by the blade,*

*wherein the projecting area only extends from the cold gas side and partially defines a gap positioned to be disposed between mechanically connected platforms and in communication with space between the hot gas side and blade, wherein the first edge extends from the upstream side of the platform to the downstream side of the platform and from the cold gas side of the platform to the hot gas side of the platform, and wherein the recess is arranged at a position between an edge of the projecting area which is closest to the hot gas side and the hot gas side.*

*12. A guide vane element for a gas turbine, comprising at least one platform and a blade extending from the platform, the platform comprising a hot gas side adjacent the blade and a cold gas side opposite the hot gas side, the platform further comprising at least a first edge having a surface extending from the hot gas side to the cold gas side and at least one projecting area extending a first elevation from the surface, wherein the projecting area only extends from the cold gas side and partially defines a gap positioned to be disposed between mechanically connected platforms and in communication with space between the hot gas side and blade, wherein the at least one platform comprises a first platform and a second platform, with the blade extending from the first to the second platform, wherein the first and the second platforms each comprise at least a first edge having a surface extending from the hot gas side to the cold gas side, and at least one projecting area extending a first elevation from the surface and displaced from the hot gas side.*

*13. The guide vane element of claim 12, wherein the projecting areas are symmetrically disposed on the platforms.*

*14. A guide vane element for a gas turbine, comprising at least one platform and a blade extending from the platform, the platform comprising a hot gas side adjacent the blade and a cold gas side opposite the hot gas side, the platform further comprising at least a first edge having a surface extending from the hot gas side to the cold gas side and at least one projecting area extending a first elevation from the surface, wherein the projecting area only extends from the cold gas side and partially defines a gap positioned to be disposed between mechanically connected platforms and in communication with space between the hot gas side and blade, wherein the gap extends essentially from the upstream side of the platform to the downstream side of the platform, and wherein the gap comprises a width between 0.5 mm and 1.0 mm and a depth between 10 mm and 30 mm.*

*15. A guide vane element for a gas turbine, comprising at least one platform and a blade extending from the platform, the platform comprising a hot gas side adjacent the blade and a cold gas side opposite the hot gas side, the platform further comprising at least a first edge having a surface extending from the hot gas side to the cold gas side and at least one projecting area extending a first elevation from the surface, wherein the projecting area only extends from the cold gas side and partially defines a gap positioned to be disposed between mechanically connected platforms and in communication with space between the hot gas side and blade, and wherein the projecting area comprises a spacer separately formed from the platform.*

*16. A guide vane assembly for a gas turbine comprising:*

*two platforms each configured for coupling to a housing of the turbine, each platform comprising two outer edges;*

*a vane blade disposed between the platforms and coupled thereto;*

*at least one attachment area comprising a raised portion with a hole extending therethrough, a projection around the hole, and a recess spaced from the projection for receiving a seal;*

*wherein the at least one attachment area is disposed proximate at least one of the edges and does not extend between the platforms; and*

*wherein the projection partially defines a gap positioned to be disposed between mechanically connected platforms and in communication with space between the mechanically connected platforms on a hot gas side thereof.*

*17. The guide vane assembly of claim 16, wherein the projection comprises a region integrally formed with the raised portion.*

*18. The guide vane assembly of claim 17, wherein the region is ring-shaped.*

*19. The guide vane assembly of claim 16, wherein the projection comprises a spacer separately formed from the raised portion.*

*20. The guide vane assembly of claim 16, wherein the at least one attachment area comprises two attachment areas.*

*21. The guide vane assembly of claim 16, wherein at least one of the attachment areas is provided on each of the platforms.*

*22. The guide vane assembly of claim 16, wherein a plurality of the attachment areas are provided proximate one of the edges.*

*23. The guide vane assembly of claim 16, wherein a plurality of the attachment areas are provided proximate each of the two edges of one of the platforms.*

*24. The guide vane assembly of claim 16, wherein a plurality of the attachment areas are provided proximate each of the two edges of each of the platforms.*

*25. The guide vane assembly of claim 16, wherein each platform further comprises opposing ribs disposed transverse to the edges, and wherein the gap is further open to space between the opposing ribs of one of the platforms.*

*26. The guide vane assembly of claim 16, wherein the gap extends from one of the outer edges of a first of the platforms to the other of the outer edges thereof.*

*27. The guide vane assembly of claim 16, wherein the gap extends from one of the outer edges of a second of the platforms to the other of the outer edges thereof.*

*28. The guide vane assembly of claim 16, wherein the gap comprises a width between 0.5 mm and 1.0 mm and a depth between 10 mm and 30 mm.*

*29. The guide vane assembly of claim 16, further comprising a screw configured to extend through the hole and a nut for coupling to the screw.*

*30. The guide vane assembly of claim 16, further comprising a seal extending into the recess and the gap.*

* * * * *